United States Patent
Oroskar (10) Patent No.: US 9,763,141 B1
(45) Date of Patent: Sep. 12, 2017

(54) CONTROLLING HANDOFF AND CHANNEL ASSIGNMENT PARAMETERS BASED ON DEVICE TYPE

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 232 days.

(21) Appl. No.: 14/160,014

(22) Filed: Jan. 21, 2014

(51) Int. Cl.
 *H04W 72/00* (2009.01)
 *H04W 36/00* (2009.01)
 *H04W 72/08* (2009.01)
 *H04W 72/04* (2009.01)
 *H04W 84/18* (2009.01)
 *H04W 28/26* (2009.01)
 *H04W 16/10* (2009.01)
 *H04W 72/02* (2009.01)
 *H04W 4/00* (2009.01)

(52) U.S. Cl.
 CPC ........ *H04W 36/0005* (2013.01); *H04W 4/005* (2013.01); *H04W 16/10* (2013.01); *H04W 28/26* (2013.01); *H04W 72/02* (2013.01); *H04W 72/046* (2013.01); *H04W 72/08* (2013.01); *H04W 84/18* (2013.01)

(58) Field of Classification Search
 CPC ... H04W 4/005; H04W 72/046; H04W 72/08; H04W 84/18; H04W 72/02; H04W 16/10; H04W 28/26
 USPC .................................................. 455/446–453
 See application file for complete search history.

(56) References Cited

U.S. PATENT DOCUMENTS

| 5,369,681 A | 11/1994 | Boudreau et al. |
| 5,737,703 A | 4/1998 | Byrne |

(Continued)

FOREIGN PATENT DOCUMENTS

| EP | 2 244 502 | 10/2010 |
| WO | 01/47287 | 6/2001 |
| WO | 2011/053222 | 5/2011 |

OTHER PUBLICATIONS

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.

(Continued)

*Primary Examiner* — Charles Appiah
*Assistant Examiner* — Jaime Holliday (57) ABSTRACT

A determination may be made that resources from wireless coverage areas of a radio access network (RAN) are to be assigned to a particular wireless communication device (WCD), and that the particular WCD is configured for machine-to-machine (M2M) communication. Possibly in response to making the determination, the RAN may assign resources from a first extent of wireless coverage areas for substantially simultaneous communication between the RAN and the particular WCD. For other WCDs not configured for M2M communication, resources from a second extent of wireless coverage areas may be assigned for substantially simultaneous communication between the RAN and the other WCDs. The first extent may be greater than the second extent.

20 Claims, 6 Drawing Sheets

(56) References Cited

U.S. PATENT DOCUMENTS

| | | |
|---|---|---|
| 5,774,461 A | 6/1998 | Hyden et al. |
| 5,778,319 A | 7/1998 | Sawaki |
| 5,898,679 A | 4/1999 | Brederveld et al. |
| 5,907,540 A | 5/1999 | Hayashi |
| 5,978,463 A | 11/1999 | Jurkevics et al. |
| 6,069,871 A | 5/2000 | Sharma et al. |
| 6,111,865 A | 8/2000 | Butler et al. |
| 6,115,762 A | 9/2000 | Bell et al. |
| 6,181,945 B1 | 1/2001 | Lee |
| 6,185,421 B1 | 2/2001 | Alperovich et al. |
| 6,205,495 B1 | 3/2001 | Gilber et al. |
| 6,216,004 B1 | 4/2001 | Tiedemann, Jr. et al. |
| 6,223,042 B1 | 4/2001 | Raffel |
| 6,289,227 B1 | 9/2001 | Shi |
| 6,292,747 B1 | 9/2001 | Amro et al. |
| 6,295,451 B1 | 9/2001 | Mimura |
| 6,307,846 B1 | 10/2001 | Willey |
| 6,327,254 B1 | 12/2001 | Chuah |
| 6,330,244 B1 | 12/2001 | Swartz et al. |
| 6,438,117 B1 | 8/2002 | Grilli et al. |
| 6,556,831 B1 | 4/2003 | Buppelmann |
| 6,643,520 B1 | 11/2003 | Kim et al. |
| 6,650,912 B2 | 11/2003 | Chen et al. |
| 6,680,923 B1 | 1/2004 | Leon |
| 6,687,285 B1 | 2/2004 | Jou |
| 6,745,039 B1 | 6/2004 | Di Lalla |
| 6,798,786 B1 | 9/2004 | Lo et al. |
| 6,895,058 B2 | 5/2005 | Abrishamkar et al. |
| 6,922,561 B2 | 7/2005 | Chen et al. |
| 6,963,750 B1 | 11/2005 | Cheng et al. |
| 6,980,820 B2 | 12/2005 | Sinnarajah et al. |
| 7,065,361 B1 | 6/2006 | Fortuna |
| 7,130,625 B2 | 10/2006 | Akgun et al. |
| 7,167,458 B2 | 1/2007 | Agashe et al. |
| 7,177,658 B2 | 2/2007 | Willenegger et al. |
| 7,193,987 B2 | 3/2007 | Vilander |
| 7,260,415 B1 | 8/2007 | Oh |
| 7,317,706 B1 | 1/2008 | Hao et al. |
| 7,349,699 B1 | 3/2008 | Kelly et al. |
| 7,366,526 B2 | 4/2008 | Zhang et al. |
| 7,376,091 B1 | 5/2008 | Eccles et al. |
| 7,386,030 B2 | 6/2008 | Asghar et al. |
| 7,408,948 B2 | 8/2008 | Lopponen et al. |
| 7,693,526 B2 | 4/2010 | Qian et al. |
| 7,720,021 B1 | 5/2010 | Zhou et al. |
| 7,768,998 B1 | 8/2010 | Everson et al. |
| 7,873,074 B1 | 1/2011 | Boland |
| 7,953,040 B2 | 5/2011 | Harikumar et al. |
| 8,139,525 B1 | 3/2012 | Vondemkamp et al. |
| 8,160,611 B1 | 4/2012 | Oroskar |
| 8,160,618 B2 | 4/2012 | Harris |
| 8,160,619 B1 | 4/2012 | Oroskar et al. |
| 8,203,963 B1 | 6/2012 | Oroskar et al. |
| 8,204,517 B1 | 6/2012 | Rai et al. |
| 8,238,906 B1 | 8/2012 | Oroskar et al. |
| 8,254,920 B1 | 8/2012 | Oroskar et al. |
| 8,254,930 B1 | 8/2012 | Mauer et al. |
| 8,265,039 B2 | 9/2012 | Reza et al. |
| 8,270,979 B1 | 9/2012 | Vargantwar |
| 8,306,558 B1 | 11/2012 | Oroskar et al. |
| 8,355,740 B1 | 1/2013 | Oroskar et al. |
| 8,359,028 B1 | 1/2013 | Vargantwar et al. |
| 8,391,858 B1 | 3/2013 | Vargantwar et al. |
| 8,396,076 B2 | 3/2013 | Borella et al. |
| 8,452,312 B1 | 5/2013 | Oroskar et al. |
| 8,457,069 B1 | 6/2013 | Vargantwar et al. |
| 8,521,195 B1 | 8/2013 | Oroskar et al. |
| 2001/0034233 A1 | 10/2001 | Tiedemann, Jr. et al. |
| 2001/0036830 A1 | 11/2001 | Wu et al. |
| 2002/0082010 A1 | 6/2002 | Koorapaty et al. |
| 2003/0063569 A1 | 4/2003 | Kalliokulju et al. |
| 2003/0091021 A1 | 5/2003 | Trossen et al. |
| 2003/0189950 A1 | 10/2003 | Spear et al. |
| 2004/0002340 A1 | 1/2004 | Lim et al. |
| 2004/0008627 A1 | 1/2004 | Garg et al. |
| 2004/0037264 A1 | 2/2004 | Khawand |
| 2004/0125768 A1 | 7/2004 | Yoon et al. |
| 2004/0165563 A1 | 8/2004 | Hsu et al. |
| 2004/0224719 A1 | 11/2004 | Nounin et al. |
| 2004/0236850 A1 | 11/2004 | Krumm et al. |
| 2004/0252669 A1 | 12/2004 | Hosein |
| 2005/0085253 A1 | 4/2005 | Mansour |
| 2005/0164718 A1 | 7/2005 | Rajkotia et al. |
| 2005/0261899 A1 | 11/2005 | Brueck et al. |
| 2005/0288018 A1 | 12/2005 | Huang et al. |
| 2006/0040681 A1 | 2/2006 | Julka et al. |
| 2006/0058056 A1 | 3/2006 | Das et al. |
| 2006/0142051 A1 | 6/2006 | Purnadi et al. |
| 2006/0160551 A1 | 7/2006 | Matoba et al. |
| 2006/0174015 A1 | 8/2006 | Arauz-Rosado |
| 2006/0199608 A1 | 9/2006 | Dunn et al. |
| 2006/0221885 A1 | 10/2006 | Nagaraj |
| 2006/0251033 A1 | 11/2006 | Oprescu-Surcobe et al. |
| 2007/0043558 A1 | 2/2007 | Schwarz et al. |
| 2007/0047707 A1 | 3/2007 | Mayer et al. |
| 2007/0053336 A1 | 3/2007 | Petrovic et al. |
| 2007/0105535 A1 | 5/2007 | Jacobson et al. |
| 2007/0173252 A1 | 7/2007 | Jiang |
| 2007/0232330 A1 | 10/2007 | Ranganathan |
| 2008/0025235 A1 | 1/2008 | Mahany et al. |
| 2008/0028695 A1 | 2/2008 | Fennell |
| 2008/0032713 A1 | 2/2008 | Yang |
| 2008/0070596 A1 | 3/2008 | Willey |
| 2008/0096520 A1 | 4/2008 | Benco et al. |
| 2008/0096585 A1 | 4/2008 | Willey |
| 2008/0192666 A1 | 8/2008 | Koskan et al. |
| 2008/0293419 A1 | 11/2008 | Somasundaram et al. |
| 2008/0293437 A1 | 11/2008 | Ranganathan et al. |
| 2008/0293438 A1 | 11/2008 | Harris |
| 2009/0016328 A1 | 1/2009 | Peisa et al. |
| 2009/0061854 A1 | 3/2009 | Gillot et al. |
| 2009/0209300 A1 | 8/2009 | Furbeck |
| 2009/0227277 A1 | 9/2009 | Gupta et al. |
| 2009/0247137 A1 | 10/2009 | Awad |
| 2009/0303983 A1 | 12/2009 | Kennedy |
| 2009/0322582 A1 | 12/2009 | Baugh et al. |
| 2010/0311420 A1 | 12/2010 | Reza et al. |
| 2010/0322198 A1 | 12/2010 | Friday et al. |
| 2011/0021197 A1 | 1/2011 | Ngai |
| 2011/0034167 A1 | 2/2011 | Ben-Shaul et al. |
| 2011/0051169 A1 | 3/2011 | Takematsu |
| 2011/0159931 A1 | 6/2011 | Boss et al. |
| 2013/0028224 A1* | 1/2013 | Chen ............... H04W 76/02 370/329 |
| 2013/0029713 A1* | 1/2013 | Jang et al. ............ 455/517 |
| 2013/0130738 A1 | 5/2013 | Cherian et al. |
| 2013/0315215 A1* | 11/2013 | Beale ............... H04W 72/1252 370/336 |
| 2014/0087721 A1* | 3/2014 | Dimou ............... 455/423 |
| 2014/0128062 A1* | 5/2014 | Batchu et al. ......... 455/435.1 |
| 2014/0192659 A1 | 7/2014 | Tian et al. |
| 2014/0349660 A1* | 11/2014 | Abdalla ............... 455/450 |
| 2015/0009813 A1* | 1/2015 | Nguyen ............... 370/230 |

OTHER PUBLICATIONS

Advisory Action for U.S. Appl. No. 11/535,870 dated Feb. 18, 2010, 14 pages.

Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.

CouthIT, "EVRC-A," 1 page, May 18, 2012 (www.couthit.com/codec-evrc.asp).

CouthIT, "EVRC-B," 1 page, May 18, 2012 (www.couthit.com/codec-evrc-b.asp).

CouthIT, "EVRC-NW," 2 pages, May 18, 2012 (www.couthit.com/codec-evrc-nw.asp).

CouthIT, "EVRC-C, EVRC-WB," 2 pages, May 18, 2012 (www.couthit.com/codec-evrc-wb.asp).

Desineni et al., "RTP Payload Format for the Enhanced Variable Rate Wideband Codec (EVRC-WB) and the Media Subtype (56) References Cited

OTHER PUBLICATIONS

Updates for EVRC-B Codec," Network Working Group, pp. 1-25 (Feb. 2008).
"E-200 Cassiopeia Pocket PC 2002," Casio, http://www.casio.com/personalpcs/products.cfm?section=19&product=4146, printed Feb. 22, 2002.
"Enhanced Variable Rate Codec, Speech Service Options 3, 68, 70, and 73 for Wideband Spread Spectrum Digital Systems," 3rd Generation Partnership Project 2, 3GPP2 C.S0014-D, Version 1, pp. 1-1 through 9-24 (May 2009).
Final Office Action for U.S. Appl. No. 11/535,870 dated Nov. 12, 2009, 22 pages.
First Action Interview Pilot Program Pre-Interview Communication for U.S. Appl. No. 13/483,920 mailed Sep. 26, 2013 (29 pages).
Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).
International Search Report and Written Report for PCT/US2012/028070 mailed May 7, 2012, 15 pages.
Internet Engineering Task Force ("IETF") Request for Comments ("RFCs") 768, "User Datagram Protocol," J. Postel, Aug. 1980.
Internet Engineering Task Force ("IETF") Request for Comments ("RFCs") 791, "Internet Protocol DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification," Information Sciences Institute, Sep. 1981.
Notice of Allowance for U.S. Appl. No. 13/011,028 mailed Dec. 7, 2012 (15 pages).
NTT DoCoMo et al., "IDLE Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
Office Action for U.S. Appl. No. 11/535,870 dated Apr. 3, 2009, 14 pages.
Office Action for U.S. Appl. No. 12/815,700 dated Dec. 14, 2011, 9 pages.
Office Action for U.S. Appl. No. 12/815,709 dated Feb. 21, 2012, 5 pages.
Office Action for U.S. Appl. No. 13/483,933 mailed Oct. 7, 2013 (25 pages).
Office Action for U.S. Appl. No. 13/598,042 mailed Oct. 25, 2012 (35 pages).
Office Action for U.S. Appl. No. 11/393,058, dated Jan. 21, 2009, 21 pages.
Perkins, C., "IP Mobility Support," Network Working Group, Request for Comments: 2002, Oct. 1996, 79 pages.
Perkins, C., "IP Encapsulation within IP," Network Working Group, Request for Comments: 2003, Oct. 1996, 14 pages.
Perkins, C., "Minimal Encapsulation within IP," Network Working Group, Request for Comments: 2004, Oct. 1996.
Solomon, J., "Applicability Statement for IP Mobility Support," Network Working Group, Request for Comments: 2005, Oct. 1996, 5 pages.
TIA Standard, "Interoperability Test Specification for cdma2000® Air Interface," TIA-1036, Section 3.11, Jan. 2005, 4 pages.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.
U.S. Appl. No. 12/261,229, filed Oct. 30, 2008, 55 pages.
U.S. Appl. No. 12/553,661, filed Sep. 3, 2009, 33 pages.
U.S. Appl. No. 12/690,629, filed Jan. 20, 2012, 38 pages.
U.S. Appl. No. 12/854,119, filed Aug. 10, 2010, 54 pages.
U.S. Appl. No. 11/455,602, filed Jun. 19, 2006, 36 pages.
U.S. Appl. No. 12/703,467, filed Feb. 10, 2010, 37 pages.
U.S. Appl. No. 13/724,053, filed Dec. 21, 2012, 57 pages.
Pre-Interview First Office Action for U.S. Appl. No. 14/160,032 mailed Jul. 2, 2015, 5 pages.

\* cited by examiner

CONTROLLING HANDOFF AND CHANNEL ASSIGNMENT PARAMETERS BASED ON DEVICE TYPE

BACKGROUND

Wireless service providers typically design their wireless networks to include a number of partially-overlapping wireless coverage areas. A wireless communication device (WCD) may use these wireless coverage areas during call establishment, as well as to exchange bearer traffic with a radio access network (RAN) during calls. In some situations, the default communication parameters associated with call establishment and bearer traffic exchange may not be suitable for all types of WCDs.

OVERVIEW

During call establishment and/or during a call, a WCD may communicate substantially simultaneously via a number of wireless coverage areas. For instance, the WCD may receive the same information in two or more messages via two or more different wireless coverage areas at approximately the same time. This substantially simultaneous communication may improve the reliability of communication involving the WCD.

WCDs that engage primarily or exclusively in machine-to-machine (M2M) communication might engage in short calls to exchange relatively small amounts of data with another device. In some cases, this data is important, and other devices or systems rely upon receiving it in a predictable, scheduled fashion. Thus, for M2M devices, it is desirable to have a high call completion success rate, as well as sufficient wireless bearer channel capacity to facilitate rapid exchange of the data. Adjusting the extent of the substantially simultaneous communication for M2M devices may result in these objectives being achieved more frequently.

Accordingly, in a first example embodiment, a determination may be made that resources from wireless coverage areas of a RAN are to be assigned to a particular WCD, and that the particular WCD is configured for M2M communication. Possibly in response to making the determination, the RAN may assign resources from a first extent of wireless coverage areas for substantially simultaneous communication between the RAN and the particular WCD. For other WCDs not configured for M2M communication, resources from a second extent of wireless coverage areas may be assigned for substantially simultaneous communication between the RAN and the other WCDs. The first extent may be greater than the second extent.

A second example embodiment may include a RAN, radiating to define a plurality of wireless coverage areas, and a RAN device. The RAN device may be located within the RAN, and may be configured to assign resources from a first extent of the wireless coverage areas for substantially simultaneous communication between the RAN and a first WCD served by the RAN. The RAN device may also be configured to assign resources from a second extent of the wireless coverage areas for substantially simultaneous communication between the RAN and a second WCD served by the RAN. The first WCD may be configured for M2M communication, and the second WCD might not be configured for M2M communication. The first extent may be greater than the second extent.

A third example embodiment may include a non-transitory, computer-readable storage medium, having stored thereon program instructions that, upon execution by a computing device, cause the computing device to perform operations in accordance with the first and/or second example embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
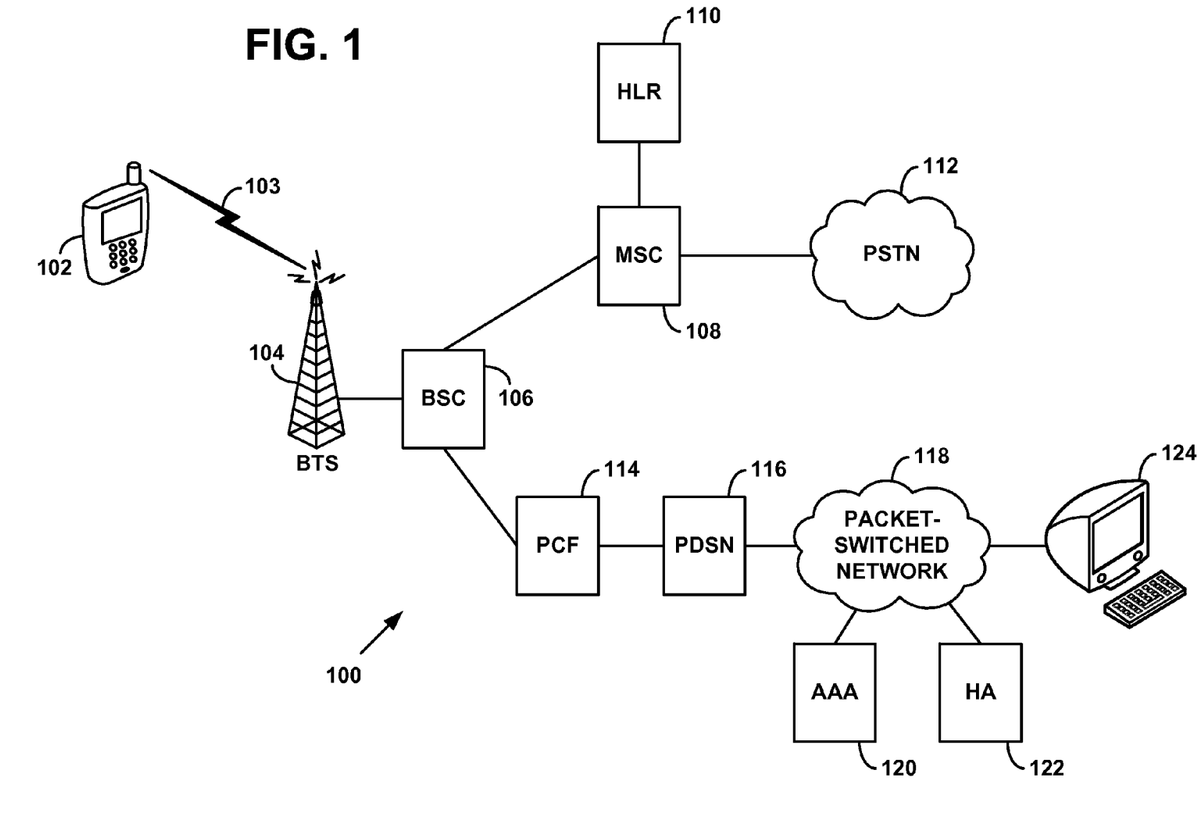
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124.

After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
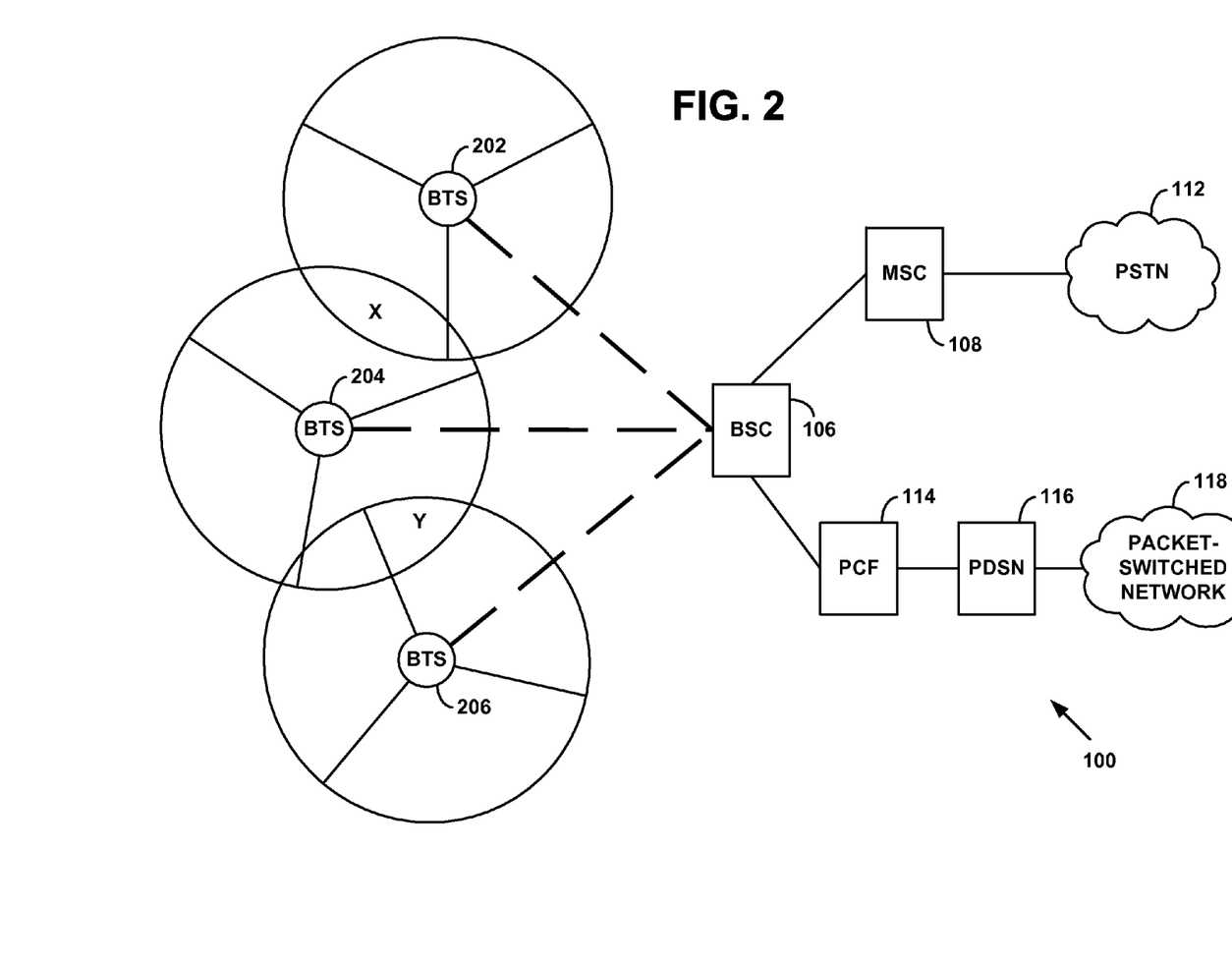
FIG. 2 depicts a RAN radiating to define several wireless coverage areas, in accordance with an example embodiment.

In practice, a BSC may serve multiple BTSs, each of which may then radiate to define one or more wireless coverage areas. This arrangement is illustrated in FIG. 2, which shows BSC 106 in network 100 coupled with BTSs 202, 204, and 206. Each BTS is shown at the core of a respective circle representing its wireless coverage, and each BTS's wireless coverage is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
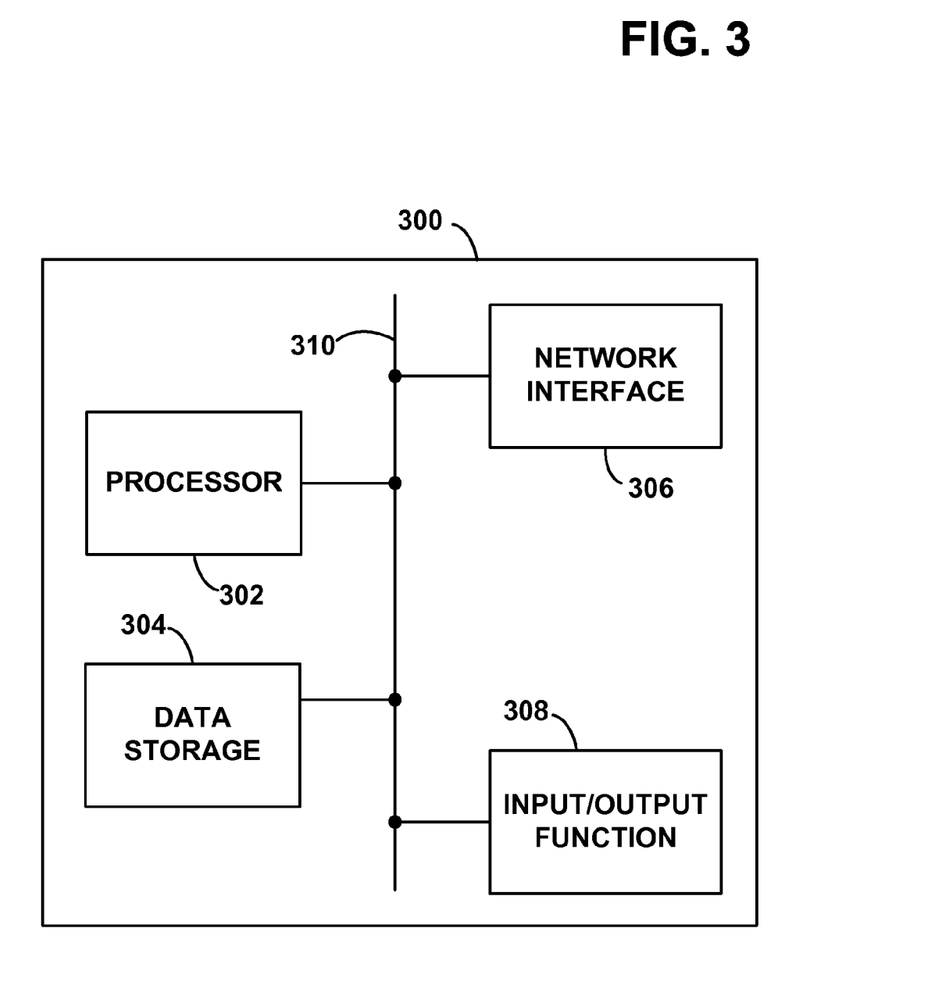
FIG. 3 is a block diagram of a RAN component, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time.

Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs), digital signal processors (DSPs), network processors, etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory, computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232, universal serial bus (USB), or high-definition multimedia interface (HDMI) port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios is described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD, such as an enhanced channel assignment message (ECRM). Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set," and the maximum number of wireless coverage areas per active set may be referred to as max_PN.

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 4:
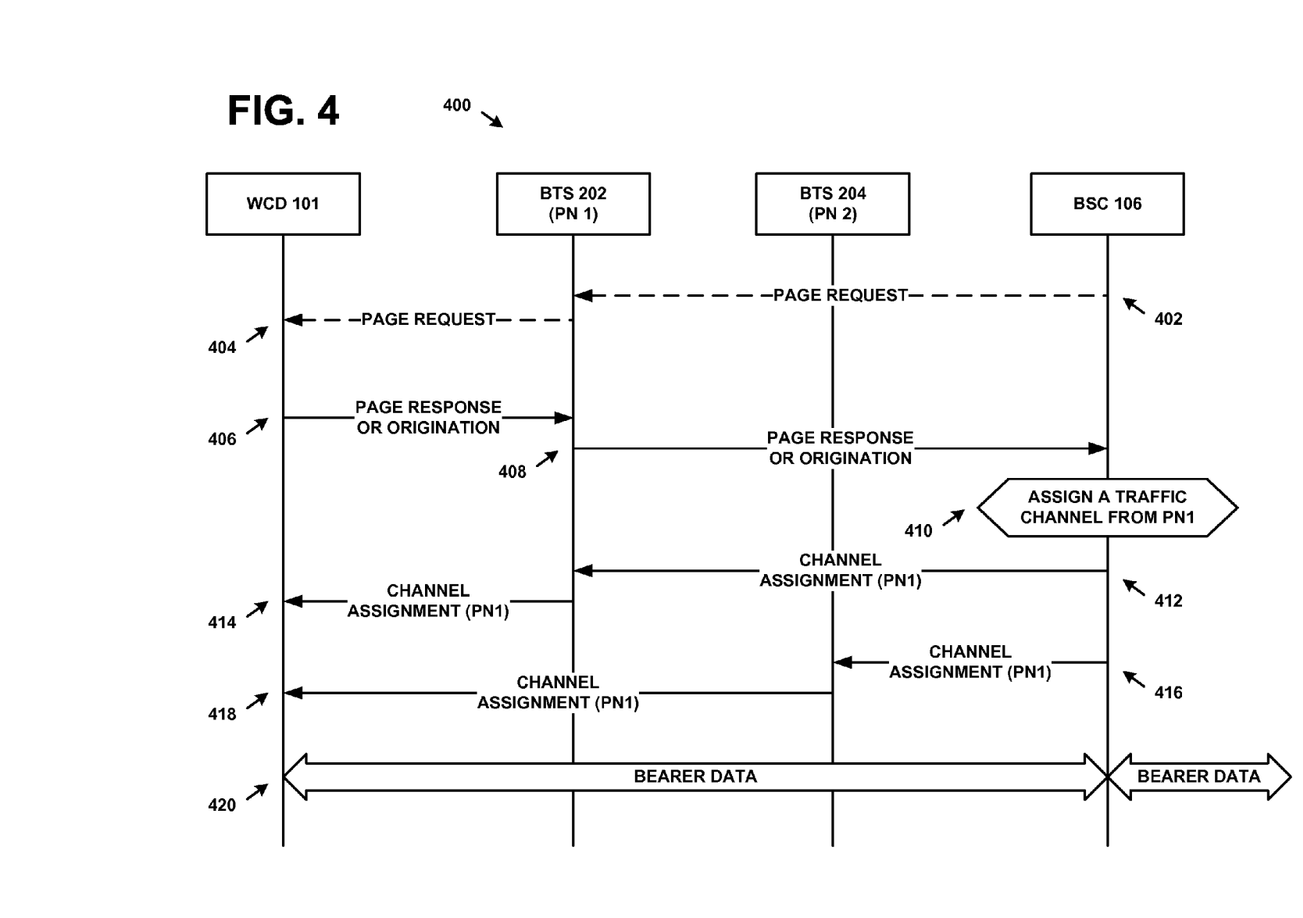
FIG. 4 is a first message flow diagram, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 may be controlled by BSC 106. WCD 101 may be able to receive pilot channel signals of sufficient strength from both PN 1 and PN 2 such that WCD 101 could communicate effectively via either of these wireless coverage areas. Without loss of generality, it is assumed that PN 1 is the primary wireless coverage area of WCD 101.

WCD 101 may report, to BSC 106, measurements of the signal strengths at which WCD 101 receives the pilot channels of PN 1 and PN 2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1 (thus, these two channel assignment messages may serve to assign the same channel). By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

These multiple channel assignment messages may be transmitted to WCD 101 substantially simultaneously. Transmitting multiple channel assignments substantially simultaneously to a particular WCD to assign one channel may be referred to as Access Handoff (AHO).

d. Substantially Simultaneous Transmission of Bearer Data

As described in Section IIb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Figure 5:
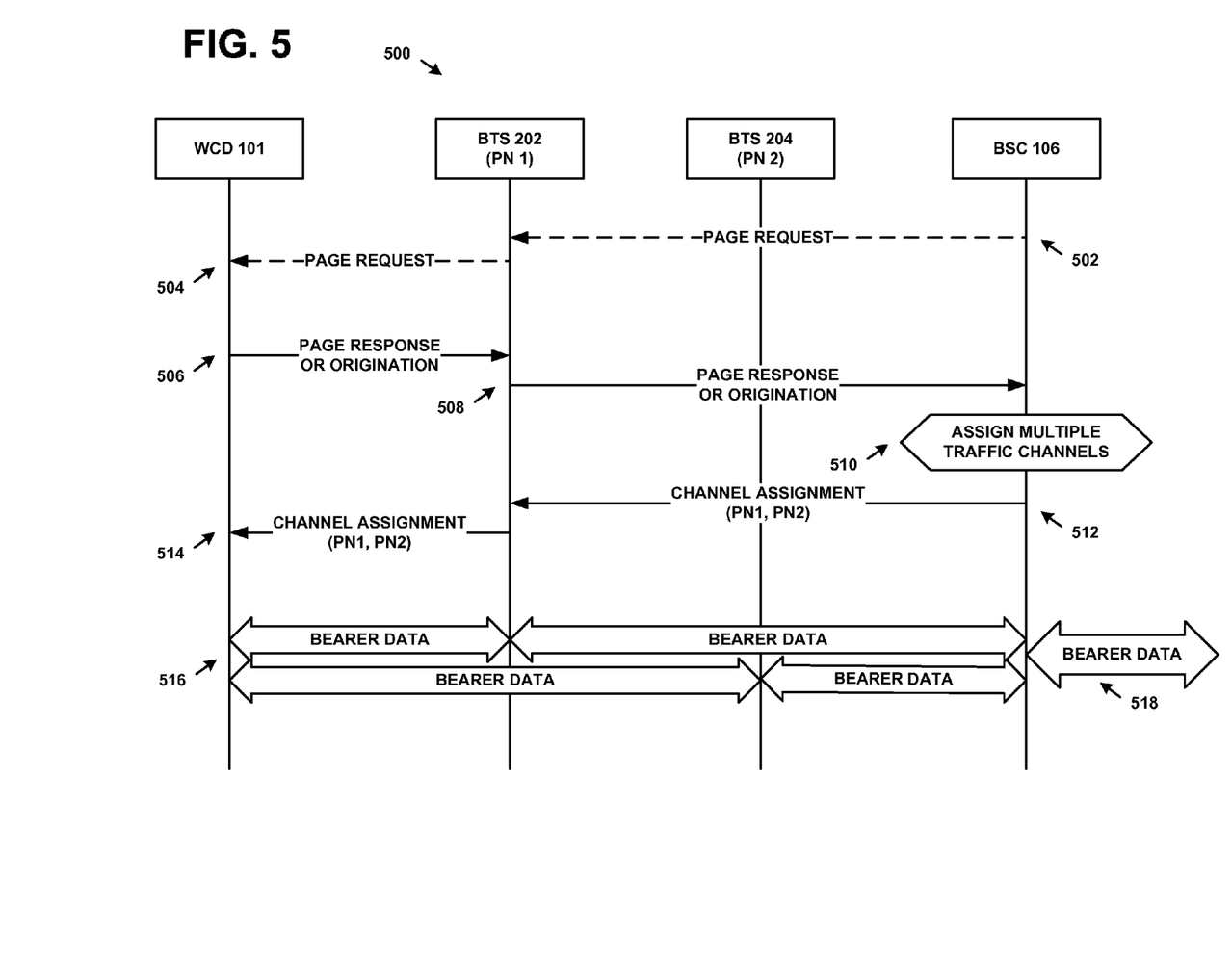
FIG. 5 is a second message flow diagram, in accordance with an example embodiment.

Channel Assignment into Soft Handoff (CASHO) has been proposed as a way of assigning multiple traffic channels from different wireless coverage areas to a WCD during call establishment. Thus, using CASHO procedures may increase the reliability and quality of the initial portions of the calls. For purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message (e.g., an ECAM) via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

In some cases, both AHO and CASHO procedures may be implemented for the same call. For instance, BSC 106 may transmit multiple ECAMs via BTS 202 and BTS 204 to WCD 101, each ECAM with traffic channel assignments for both PN 1 and PN 2. Other examples are also possible.

III. Example M2M Devices and Applications

As noted above, an M2M device may engage primarily or exclusively in communication with one or more other devices and/or systems. This communication may occur without substantive interaction between the M2M device and a human user. For instance, the M2M device may communicate according to a predetermined schedule, or may communicate based on one or more particular triggers. While this specification refers to M2M devices that are dedicated to M2M communication, some non-M2M devices may be configured to operate M2M applications.

Regardless of the M2M designation of a device or application, some extent of human interaction with such an entity may take place in order to configure, upgrade, and/or maintain the device. For instance, a remote sensor may be an M2M device. However, the remote sensor may be placed and configured by a human user. From time to time, the human user may also examine the M2M device to perform maintenance, such as rebooting the device, changing its configuration, or upgrading its software or firmware. Nonetheless, these devices may still be categorized as M2M devices due to their substantially autonomous communications with other devices.

M2M devices and applications may take various forms. For example, an M2M device may be included in a vehicle or other means of transportation. The M2M device may detect and analyze the status of the vehicle and provide status information to a third party. Such status information may include, but is not limited to, a location of the vehicle, a speed and direction of the vehicle, temperatures inside and outside the vehicle, and an analysis of damage to the vehicle. Based on the received status information, the third party may then provide emergency services, vehicle diagnostics, driving directions, or other useful information.

M2M devices can be included in other equipment as well in order to remotely monitor such equipment. For example, M2M devices may be included in household appliances (e.g., refrigerators, washing machines, etc.) and can be used to send diagnostic information to the owners or manufactures of such appliances. As another example, M2M devices may be included in medical equipment such as pacemakers, MRIs, and electrocardiograms in order to monitor a patient's health or obtain diagnostics of the medical equipment itself. M2M devices may also be included in farm equipment such as tractors and crop-irrigation equipment in order to help farmers operate or monitor such equipment from a distance. Many other implementations of M2M devices and applications are possible as well, and M2M devices are not limited to the examples provided herein.

Generally, calls involving an M2M device may exhibit a shorter average duration than calls with other types of WCDs. For instance, M2M calls may last for a few seconds, a few tens of seconds, or less than one second. On the other hand, voice calls made with mobile phones, for instance, may exhibit an average call duration of a few minutes.

IV. Example Wireless Coverage Areas Parameter Modifications for Improving M2M Device Support As noted above, an M2M device may engage primarily or exclusively in communication with one or more other devices and/or systems, possibly without substantive interaction between the M2M device and a human user.

Thus, an M2M device may be identified as such by the RAN. In some cases, the RAN may have access to or include a database of WCDs profiles. Such a database may be included as part of an HLR or AAA. Each profile in the database may include one or more identifiers of a respective WCD, such as network access identifiers (NAIs), mobile directory numbers (MDNs), mobile identification numbers (MINs), international mobile subscriber identifiers (IMSIs), electronic serial numbers (ESNs), and mobile equipment identifiers (MEIDs). Other types of identifiers may be used instead of or in addition to these types. Each profile may also include an entry indicating whether the WCD is an M2M device. Therefore, the RAN may be able to determine, via such a database, whether a particular WCD is an M2M device.

If a particular WCD is an M2M device, the RAN may modify parameters related to substantially simultaneous communications via multiple wireless coverage areas for the identified M2M device. Due to the short call lengths typically associated with M2M communication, it may be advantageous for the RAN to modify AHO and/or CASHO procedures for M2M devices in order to increase the likelihood that the M2M calls succeed and are rapidly completed. Additionally or alternatively, it may be advantageous for the RAN to increase max_PN so that the M2M device may include additional wireless coverage areas on its active set. Doing so may also increase the likelihood that the M2M calls are rapidly completed.

a. AHO

For example, the RAN may seek to increase the number of ECAMs sent during AHO procedures. Generally, in line with the discussion above, the wireless coverage areas available to an M2M device may include a primary wireless coverage area and one or more secondary wireless coverage areas. The M2M device may receive signals via the primary wireless coverage area at a primary signal strength (e.g., measured in dB), and signals via the one or more secondary wireless coverage areas at respective secondary signal strengths (e.g., also measured in dB). The RAN may choose the wireless coverage areas through which it transmits ECAMs based on respective differences between the primary signal strength and each of the secondary signal strengths.

For instance, the RAN may identify zero or more secondary wireless coverage areas for which the respective differences between the primary signal strength and the respective secondary signal strengths are less than a threshold difference. This threshold difference may be referred to herein as a "delta" between the minimum acceptable received signal strength of secondary base stations and the received signal strength of the primary wireless coverage area.

To increase the number of ECAMs sent during AHO procedures, the RAN may increase the delta. By increasing the delta, the signal strengths of more wireless coverage areas may fall within the range defined by the received signal strength of the primary wireless coverage area and the increased delta, possibly including weaker secondary coverage area signal strengths that may have otherwise been deemed too low. With more wireless coverage areas available for AHO procedures, the RAN may transmit ECAMs via a greater number of wireless coverage areas, therefore increasing the likelihood of at least one ECAM reaching the M2M device.

In practice, the wireless coverage areas that the RAN uses for transmitting ECAMs are likely to be members of the M2M device's active set. In some scenarios, however, the wireless coverage areas that the RAN uses for transmitting ECAMs may include wireless coverage areas that are not in the active set of the M2M device.

TABLE 1

| | Within Range of Default Delta: 4 dB | Within Range of Increased Delta: 6 dB |
|---|---|---|
| Signal Strength of Primary Wireless Coverage Area (PN 1): −2 dB | Yes | Yes |
| Signal Strength of Neighboring Wireless Coverage Area A (PN 2): −4 dB | Yes | Yes |
| Signal Strength of Neighboring Wireless Coverage Area B (PN 3): −12 dB | No | No |
| Signal Strength of Neighboring Wireless Coverage Area C (PN 4): −7 dB | No | Yes |

Table 1 depicts a general AHO example in which an M2M device is receiving signals from a primary wireless coverage area and three secondary wireless coverage areas. For this example, the default delta in signal strength is presumed to be 4 dB.

As shown in Table 1, the M2M device may receive signals from the primary wireless coverage area at a strength of −2 dB. The M2M device may also receive signals from secondary wireless coverage areas A, B, and C at strengths of −4 dB, −12 dB, and −7 dB, respectively. The only secondary wireless coverage area that the M2M device receives at a signal strength within 4 dB of the signal strength of the primary wireless coverage area is secondary wireless coverage area A. Therefore, in this example, the RAN may use only the primary wireless coverage area and secondary wireless coverage area A to transmit ECAMs to the M2M device. Such a transmission of ECAMs may be performed by the RAN in accordance with steps 412-418 described above with respect to FIG. 4.

However, if the delta were to be increased to 6 dB, the RAN may use the primary wireless coverage area and secondary wireless coverage areas A and C to transmit ECAMs to the M2M device. If the RAN is to assign a traffic channel from PN 1, the RAN may transmit a first ECAM for PN 1 via the primary wireless coverage area to the M2M device. Additionally, the RAN may transmit second and third ECAMs for PN 1 via secondary wireless coverage areas A and C, respectively. By using additional wireless coverage areas in an AHO procedure, the RAN can transmit more ECAMs to assign PN 1, which will increase the likelihood that the M2M device receives at least one of the ECAMs. Upon receiving at least one of the ECAMs, the M2M device may then begin exchanging bearer traffic using PN 1.

Increasing the likelihood that an M2M device receives ECAMs may be advantageous because doing so may increase the success rate of call completion. Call completion may be unsuccessful in scenarios where the M2M device receives ECAMs transmitted via one or two wireless coverage areas, especially if wireless signals from the one or two wireless coverage areas experience interference or distortion. In such scenarios, call completion is likely to be more successful when the M2M device receives ECAMs via additional wireless coverage areas. Further, increasing the likelihood that the M2M device receives ECAMs may reduce the amount of time taken to set up an M2M call, thereby reducing the overall time required for an M2M call.

b. CASHO

For CASHO procedures, the RAN may increase the number of traffic channels assigned per ECAM. To do so, the RAN may increase the delta between the minimum acceptable received signal strength of secondary base stations and the received signal strength of the primary wireless coverage area.

By increasing the delta used for CASHO procedures, the signal strengths of more wireless coverage areas may fall within the range defined by the received signal strength of the primary wireless coverage area and the increased delta, which may result in more wireless coverage areas being added to the M2M device's active set.

It should also be noted that the delta used for CASHO procedures may the same or different from the delta used for AHO procedures, depending on the scenario.

TABLE 2

|  | Within Range of Default Delta: 3 dB | Within Range of Increased Delta: 8 dB |
| --- | --- | --- |
| Signal Strength of Primary Wireless Coverage Area (PN 1): −2 dB | Yes | Yes |
| Signal Strength of Neighboring Wireless Coverage Area A (PN 2): −12 dB | No | No |
| Signal Strength of Neighboring Wireless Coverage Area B (PN 3): −4 dB | Yes | Yes |
| Signal Strength of Neighboring Wireless Coverage Area C (PN 4): −10 dB | No | Yes |

Table 2 depicts a general CASHO example in which an M2M device is receiving signals from a primary wireless coverage area and three secondary wireless coverage areas. The default delta in signal strength is presumed to be 3 dB.

Here, the M2M device receives signals from the primary wireless coverage area at a strength of −2 dB. The M2M device also receive signals from secondary wireless coverage areas A, B, and C at strengths of −12 dB, −4 dB, and −10 dB, respectively. Thus, the M2M device receives signals from secondary wireless coverage area B at a strength that is within 3 dB of the signal strength that the M2M device receives from the primary wireless coverage area. Therefore, in this example, traffic channels from the primary wireless coverage area and secondary wireless coverage area B may be assigned to the M2M device. To assign these traffic channels in accordance with CASHO procedures, the RAN may, for instance, perform steps 512 and 514 described above with respect to FIG. 5. The M2M device may then operate as described in steps 516 and 518.

However, if the delta were to be increased to 8 dB, traffic channels from the primary wireless coverage area and secondary wireless coverage areas B and C would be assigned to the M2M device. As such, in a CASHO scenario, the RAN may transmit an ECAM including traffic channel assignments for multiple PNs (i.e., PN 1, PN 3, and PN 4) via the primary wireless coverage area or a secondary wireless coverage area to the M2M device. Thus, by assigning traffic channels from additional wireless coverage areas (e.g., PN 1, PN 3, and PN 4), the RAN may increase the likelihood that the M2M device sufficiently receives bearer traffic from the RAN and sufficiently transmits bearer traffic to the RAN using PN 1, PN 3, and PN 4. The M2M device may have sufficiently diverse bearer capacity to expeditiously communicate with the RAN.

Improving CASHO procedures in this manner may be advantageous because doing so may result in higher signal quality at the beginning of an M2M call, and therefore a higher data rate (i.e., bit rate) and a shorter call is also likely to result. This may be especially desirable due to the short average duration of M2M calls.

c. AHO and CASHO Together

Since AHO parameters are associated with the duration of call setup and CASHO parameters are associated with the duration of exchange of bearer traffic, reducing the total duration of time it takes to complete an M2M call may be accomplished by modifying parameters related to both AHO and CASHO procedures.

For instance, a given M2M call completed in ten seconds may be accomplished by the RAN using two wireless coverage areas to transmit ECAMs to the M2M device to setup the call in addition to the RAN assigning a traffic channel from one wireless coverage area for bearer traffic exchange. However, the same M2M call may be completed in less than ten seconds if the RAN uses three wireless coverage areas to transmit ECAMs to the M2M device to setup the call in addition to the RAN assigning traffic channels from four wireless coverage areas for bearer traffic exchange. Thus, modification of the default communication parameters associated with call establishment and bearer traffic exchange may result in shorter call duration.

d. Increasing max_PN

Moreover, the RAN increasing max_PN is another example modification the RAN may make to its parameters in order to increase the quality and speed of M2M calls. In line with the discussion above, max_PN may refer to the maximum number of wireless coverage areas per the M2M device's active set. By increasing max_PN (e.g., greater than six wireless coverage areas) for an M2M call, the RAN may transmit bearer data to an M2M device via additional wireless coverage areas in the M2M device's active set, thus increasing the likelihood of the M2M device receiving the bearer data correctly.

In some scenarios, AHO and/or CASHO procedures may be involved in an M2M call for which max_PN is increased. Furthermore, it should be understood that increasing max_PN and increasing the delta for AHO and/or CASHO procedures are orthogonal features which may be implemented additionally to or alternatively from each other.

V. Example Operations

Figure 6:
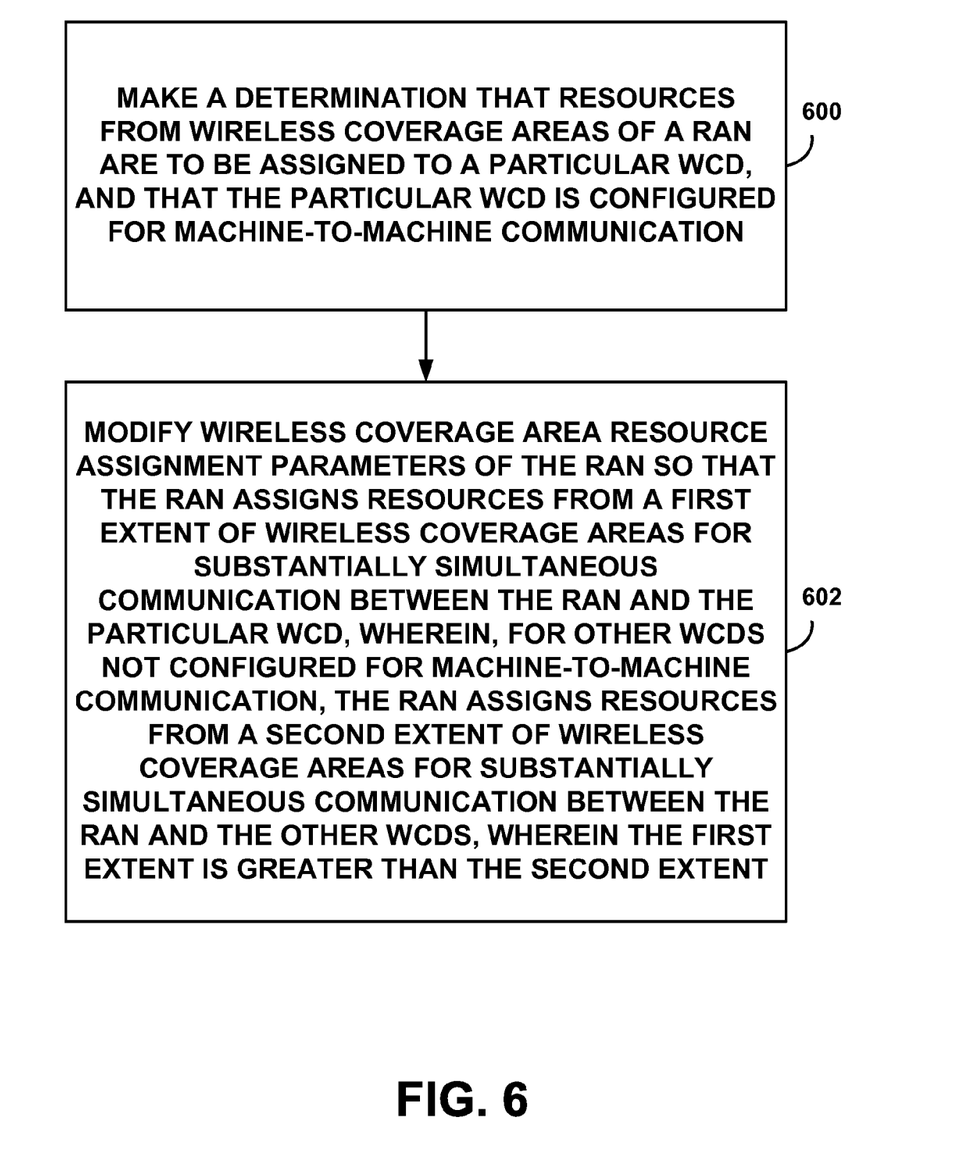
FIG. 6 is a flow chart, in accordance with an example embodiment.

FIG. 6 is a flow chart depicting an example embodiment. One or more steps of either of this embodiment may be carried out, for instance, by a RAN component exemplified by RAN device 300.

At step 600 of FIG. 6, a determination may be made that resources from wireless coverage areas of the RAN are to be assigned to a particular WCD, and that the particular WCD is configured for M2M communication.

Determining that the particular WCD is configured for M2M communication may involve determining that the particular WCD is configured to autonomously initiate or receive communication from another networked device without substantive interaction with a human user. In some cases, the M2M device may be configured to operate without human interaction, except possibly for initial configuration. In other cases, the M2M device may facilitate occasional human interaction but otherwise communicates autonomously.

In order to determine whether a particular WCD is configured for M2M communication a RAN device may obtain an identifier of the particular WCD, use the identifier to locate a profile of the particular WCD in a device database, and determine that the particular WCD is configured for M2M communication based on information in the profile.

As step 602, possibly in response to making the determination, the RAN may assign resources from a first extent of wireless coverage areas for substantially simultaneous communication between the RAN and the particular WCD. However, for other WCDs not configured for M2M communication, the RAN may assign resources from a second extent of wireless coverage areas for substantially simultaneous communication between the RAN and the other WCDs.

The RAN (or RAN component) may modify wireless coverage resource assignment parameters of the RAN so that the RAN may assign the resources from the first extent of wireless coverage areas for substantially simultaneous communication between the RAN and the particular WCD.

The first extent may be greater than the second extent. Thus, in at least some cases, M2M devices may be assigned more wireless coverage areas for substantially simultaneous communication than non-M2M devices.

The substantially simultaneous communication may involve, during establishment of a call involving the particular WCD, assigning, to the particular WCD, respective traffic channels from each of the first extent of wireless coverage areas. The substantially simultaneous communication may also involve, during an initial portion of the call, the RAN substantially simultaneously exchanging bearer traffic with the particular WCD via each of the assigned traffic channels. In some configurations, the RAN may transmit and/or receive identical copies of the same bearer traffic via each of the assigned traffic channels. In line with the description of FIG. 5, the particular WCD (e.g., WCD 101) may receive forward direction bearer data streams from the RAN (e.g., BSC 106), and may combine these streams into a single stream of bearer data. Conversely, the RAN may receive reverse direction bearer data streams from the particular WCD, and may also combine these streams into a single stream of bearer data.

Alternatively or additionally, the substantially simultaneous communication between the RAN and the particular WCD may involve the RAN transmitting channel assignment messages to the particular WCD via each of the first extent of wireless coverage areas. In line with the description of FIG. 4, the RAN (e.g., BSC 106) may transmit first and second channel assignment messages to the particular WCD (e.g., WCD 101) via different wireless coverage areas, with each channel assignment message including traffic channel assignments for PN 1. The particular WCD may then begin exchanging bearer traffic using PN 1.

In some embodiments, the substantially simultaneous communication via the first extent of wireless coverage areas may include the substantially simultaneous communication traversing each wireless coverage area in the first extent of wireless coverage areas at approximately the same time.

Possibly as a result of the modification of the RAN's parameters, assigning resources from the first extent of wireless coverage areas for substantially simultaneous communication between the RAN and the particular WCD may result in greater call establishment success rates for the particular WCD than assigning resources from the second extent of wireless coverage areas for the substantially simultaneous communication between the RAN and the other WCDs does for the other WCDs. Additionally, assigning resources from the first extent of wireless coverage areas for substantially simultaneous communication between the RAN and the particular WCD may result in greater communication speeds for the particular WCD than assigning resources from the second extent of wireless coverage areas for the substantially simultaneous communication between the RAN and the other WCDs does for the other WCDs. For example, more resources can be assigned from wireless coverage areas in order to improve the quality and efficiency of an M2M call because, as noted above, calls with an M2M device may be sufficiently shorter on average in duration than calls with other WCDs such as mobile phones.

It should be understood that FIG. 6 depicts a non-limiting embodiment. Thus, more or fewer steps than shown in FIG. 6 may be used without departing from the scope of the embodiments herein. Additionally, some of these steps may be repeated one or more times, or may be omitted altogether. Further, the message flows and flow charts of the figures may be combined with one another and/or with other aspects described this specification and its accompanying drawings, in whole or in part, also without departing from the scope of the embodiments herein.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

VI. Conclusion

Example embodiments have been described above. Those skilled in the art will understand, however, that changes and modifications may be made to these embodiments herein without departing from the true scope and spirit of the invention, which is defined by the claims.

What is claimed is:

1. A method comprising:
making a determination, by a radio access network (RAN) device, that resources from base transceiver stations (BTSs) of the RAN are to be assigned to a particular wireless machine-to-machine (M2M) communication device configured for M2M communication, wherein the BTSs of the RAN also serve wireless non-M2M communication devices; and
in response to making the determination, the RAN assigning resources from a first number of BTSs to provide a first number of transmission paths for communication between the RAN and the particular wireless M2M communication device, wherein the RAN assigning resources from the first number of BTSs comprises the RAN providing instructions to the particular wireless M2M communication device to adjust a maximum number of wireless coverage areas in an active set of the particular wireless M2M communication device to accommodate the first number of transmission paths, wherein, for a wireless non-M2M communication device, the RAN assigns resources from a second number of BTSs to provide a second number of transmission paths for communication between the RAN and the wireless non-M2M communication device, wherein the first number of BTSs is greater than the second number of BTSs, wherein the first number of transmission paths is greater than the second number of transmission paths, and wherein the first number of BTSs provides greater bearer channel capacity than the second number of BTSs.

2. The method of claim 1, wherein the particular wireless M2M communication device being configured for M2M communication comprises the particular wireless M2M communication device being configured to autonomously initiate or receive communication from another networked device without substantive interaction with a human user.

3. The method of claim 1, further comprising:
obtaining an identifier of the particular wireless M2M communication device;
using the identifier of the particular wireless M2M communication device to locate a profile of the particular wireless M2M communication device in a device database; and
determining that the particular wireless M2M communication device is configured for M2M communication based on information in the profile.

4. The method of claim 1, wherein the communication between the RAN and the particular wireless M2M communication device comprises:
during establishment of a call involving the particular wireless M2M communication device, assigning, to the particular wireless M2M communication device, respective traffic channels from each of the first number of BTSs.

5. The method of claim 4, wherein the communication between the RAN and the particular wireless M2M communication device comprises:
during an initial portion of the call, the RAN exchanging bearer traffic with the particular wireless M2M communication device via each of the assigned traffic channels.

6. The method of claim 5, wherein the RAN transmits and receives identical copies of the same bearer traffic via each of the assigned traffic channels.

7. The method of claim 1, wherein the communication between the RAN and the particular wireless M2M communication device comprises:
the RAN transmitting channel assignment messages to the particular wireless M2M communication device via each of the first number of transmission paths.

8. The method of claim 1, wherein the communication between the RAN and the particular wireless M2M communication device via the first number of transmission paths comprises:
the communication traversing each transmission path in the first number of transmission paths at approximately the same time.

9. The method of claim 1, wherein assigning resources from the first number of BTSs results in greater call establishment success rates for the particular wireless M2M communication device than assigning resources from the second number of BTSs does for the wireless non-M2M communication device.

10. The method of claim 1, wherein assigning resources from the first number of BTSs results in greater communication speeds for the particular wireless M2M communication device than assigning resources from the second number of BTSs does for the wireless non-M2M communication device.

11. The method of claim 1, wherein the RAN assigning resources from the first number of BTSs further comprises:
the RAN increasing a maximum acceptable difference between (i) a strength of a signal from a primary wireless coverage area received by the particular wireless M2M communication device and (ii) a minimum strength of a signal from a secondary wireless coverage area received by the particular wireless M2M communication device, wherein increasing the maximum acceptable difference configures the particular wireless M2M communication device for communication with the RAN by way of the first number of transmission paths.

12. A system comprising:
a radio access network (RAN) comprising a plurality of base transceiver stations (BTSs); and
a RAN device, within the RAN, configured to assign resources from a first number of the BTSs to provide a first number of transmission paths for communication between the RAN and a wireless machine-to-machine (M2M) communication device served by the RAN, and also configured to assign resources from a second number of the BTSs to provide a second number of transmission paths for communication between the RAN and a wireless non-M2M communication device served by the RAN, wherein the RAN device assigning resources from the first number of BTSs comprises the RAN device providing instructions to the wireless M2M communication device to adjust a maximum number of wireless coverage areas in an active set of the wireless M2M communication device to accommodate the first number of transmission paths, wherein the wireless M2M communication device is configured for M2M communication, and the wireless non-M2M communication device is not configured for M2M communication, wherein the first number of BTSs is greater than the second number of BTSs, wherein the first number of transmission paths is greater than the second number of transmission paths, and wherein the first number for BTSs provides greater bearer channel capacity than the second number of BTSs.

13. The system of claim 12, wherein the RAN is configured to assign resources from the first number of BTSs based on making a determination that resources from the plurality of BTSs are to be assigned to the wireless M2M communication device, and that the wireless M2M communication device is configured for M2M communication.

14. The system of claim 13, wherein the wireless M2M communication device being configured for M2M communication comprises the wireless M2M communication device being configured to autonomously initiate or receive communication from another networked device without substantive interaction with a human user.

15. The system of claim 12, further comprising:
a device database accessible to the RAN device, wherein the device database contains a profile of the wireless M2M communication device, indexed by an identifier of the wireless M2M communication device, and indicating that the wireless M2M communication device is configured for M2M communication.

16. The system of claim 12, wherein assigning resources from the first number of BTSs results in greater call establishment success rates for the wireless M2M communication device than assigning resources from the second number of BTSs does for the wireless non-M2M communication device.

17. An article of manufacture including a non-transitory computer-readable medium, having stored thereon program instructions that, upon execution by a computing device, cause the computing device to perform operations comprising:

making a determination that resources from base transceiver stations (BTSs) of a radio access network (RAN) are to be assigned to a particular wireless machine to machine (M2M) communication device configured for M2M communication, wherein the BTSs of the RAN also serve wireless non-M2M communication devices; and     in response to making the determination, the RAN assigning resources from a first number of BTSs to provide a first number of transmission paths for communication between the RAN and the particular wireless M2M communication device, wherein the RAN assigning resources from the first number of BTSs comprises the RAN providing instructions to the particular wireless M2M communication device to adjust a maximum number of wireless coverage areas in an active set of the particular wireless M2M communication device to accommodate the first number of transmission paths, wherein, for a wireless non-M2M communication device, the RAN assigns resources from a second number of BTSs to provide a second number of transmission paths for communication between the RAN and the wireless non-M2M communication device, wherein the first number of BTSs is greater than the second number of BTSs, wherein the first number of transmission paths is greater than the second number of transmission paths, and wherein the first number of BTSs provides greater bearer channel capacity than the second number of BTSs.

18. The article of manufacture of claim 17, wherein assigning resources from the first number of BTSs results in greater call establishment success rates for the particular wireless M2M communication device than assigning resources from the second number of BTSs does for the wireless non-M2M communication device.

19. The article of manufacture of claim 17, wherein assigning resources from the first number of BTSs results in greater communication speeds for the particular wireless M2M communication device than assigning resources from the second number of BTSs does for the wireless non-M2M communication device.

20. The article of manufacture of claim 17, wherein the RAN assigning resources from the first number of BTSs further comprises:

the RAN increasing a maximum acceptable difference between (i) a strength of a signal from a primary wireless coverage area received by the particular wireless M2M communication device and (ii) a minimum strength of a signal from a secondary wireless coverage area received by the particular wireless M2M communication device, wherein increasing the maximum acceptable difference configures the particular wireless M2M communication device for communication with the RAN by way of the first number of transmission paths.

\* \* \* \* \*